No. 883,608. PATENTED MAR. 31, 1908.
V. ANTOINE.
APPARATUS FOR SEPARATING FOREIGN SUBSTANCES FROM WATER.
APPLICATION FILED AUG. 21, 1907.
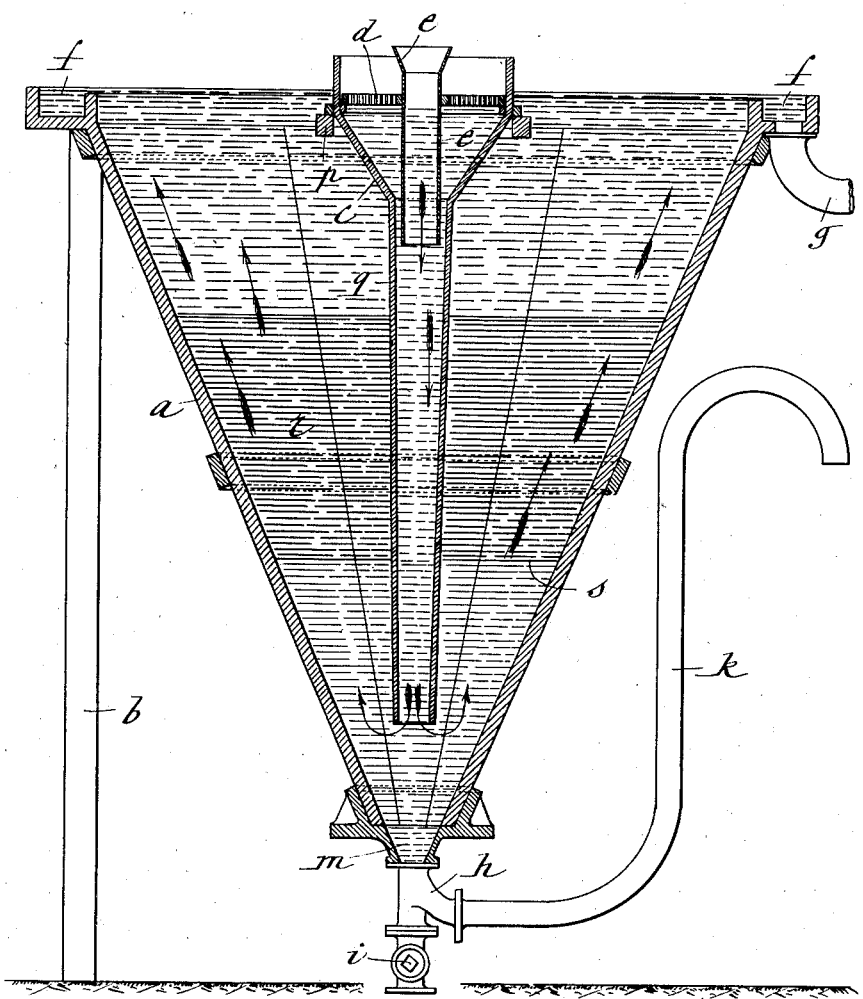
Witnesses:
Waldo M Chapin
James D'Antonio
Inventor,
Victor Antoine,
by Rosenbaum & Stockbridge
Attys.

UNITED STATES PATENT OFFICE.

VICTOR ANTOINE, OF LAMBERMONT, BELGIUM.

APPARATUS FOR SEPARATING FOREIGN SUBSTANCES FROM WATER.

No. 883,608.   Specification of Letters Patent.   Patented March 31, 1908.

Application filed August 21, 1907. Serial No. 389,451.

*To all whom it may concern:*

Be it known that I, VICTOR ANTOINE, a subject of the King of Belgium, residing at Lambermont, Belgium, have invented certain new and useful Improvements in Apparatus for Separating Foreign Substances from Water, of which the following is a specification.

This invention relates to apparatus for separating foreign substances from water, for example from water discharged from paper making machines.

It has already been proposed to use for this purpose receptacles into which the water is introduced through funnels, the separation of foreign matter being effected by reducing the velocity of the flow. These known arrangements have the disadvantage that they must be constructed of very large size, to contain a large volume of water, so that they are inconvenient and expensive, and by reason of the large volume of water the action is too slow for practical purposes, for example in the manufacture of white paper of superior quality and in the manufacture of small quantities of paper. A large amount of time is also required for cleaning the said apparatus, by reason of its large dimensions, so that continuous, uninterrupted working is impossible therewith.

To obviate these disadvantages the present invention provides means of accelerating the precipitation of the foreign matter, so that the apparatus can be considerably reduced in size, for example to have a capacity of approximately two or three cubic meters. The cost of the apparatus is by this means also considerably reduced and the charging, emptying and cleaning thereof can be effected in a few minutes.

In the improved apparatus, as in the apparatus previously known, the ascending flow of the water is utilized to produce separation, but in addition to this the invention provides means by which as soon as the water to be treated enters the apparatus a commencement of agglomeration of the foreign matter in suspension is being promoted by the action of aluminium sulfate with which the water is brought into contact.

The improved apparatus comprises a receptacle in the form of an inverted cone or pyramid. A tube with a funnel at its upper end is arranged in this receptacle to conduct a stream of water to the bottom of the latter.
An essential feature of the apparatus is that the funnel has a perforated floor or horizontal partition on which can be placed a layer of aluminium sulfate and that said floor is placed at a level somewhat below the level of the liquid in the outer receptacle and somewhat above the orifice of the pipe by which water is supplied to the funnel; this arrangement insures the slow and continuous dissolving of the precipitant by the water, which rises against the perforated floor.

After being acted on by the sulfate of aluminium the water charged with chemical products or other foreign matter descends through the tube to the bottom of the outer receptacle, whereupon the downward flow is changed into an upward flow of progressively diminishing velocity, so that the separated matter can be evacuated at the bottom of the receptacle and the purified water is discharged into an over-flow conduit at the upper part of the receptacle.

The central tube is made to extend to within a short distance of the orifice through which the foreign matter is evacuated at the bottom of the outer receptacle, so that a small portion of the current of water can be utilized as a motive agent to evacuate the deposited matter, and the apparatus can thus work uninterruptedly.

A construction embodying the invention is shown by way of example in the annexed drawing, in which is shown a vertical section of the apparatus.

The apparatus comprises a receptacle $a$ of metal or other material, the inner surface of which may be enameled, glazed or nickel-plated, and which is supported by pillars $b$ or an adjacent wall or any other suitable means.

A funnel $c$ with a downward tubular prolongation $q$ is supported in the axis of the receptacle $a$ by means of cross bars $p$. A horizontal perforated plate or floor $d$ is fixed in this funnel to support a layer of solid aluminium sulfate. This floor is placed at a level slightly below the level of the upper rim of the receptacle $a$, for example two millimeters, so that the water in the funnel only impinges on the under part of the layer of sulfate. The upper rim of the receptacle $a$ is surrounded by a circular channel $f$ which communicates with a discharge-pipe $g$ and into which the purified water overflows.

The orifice $m$ at the bottom of the receptacle $a$ communicates with the pipe $h$ provided with a cock $i$ which allows of rapidly emptying the receptacle a. The water to be treated is fed into the funnel c by means of a pipe e, the discharge-orifice of which is below the perforated plate d. An upwardly curved discharge pipe k leads from the pipe h, and has its highest level adjusted at a suitable distance below the upper level of the receptacle a. This arrangement allows of using a discharge-pipe of comparatively large cross-section, the rate of discharge being reduced as required by the rise of the pipe; the large cross-section of the pipe facilitates the flow of the separated matter and prevents obstructions.

The apparatus is adapted to work without interruption. The water charged with the substance or substances to be separated therefrom flows through the pipe e into the funnel c and comes into contact with the aluminium sulfate on the perforated plate d. From the funnel c the water descends through the tube q to the bottom of the receptacle a, whence the greater part thereof ascends again outside the tube q.

Separation of the foreign matter in the water is produced by a combination of causes, which may be stated as follows:— Normal agglomeration or aggregation of the said matter; action of the aluminium sulfate; conformation of the receptacle; action of the flow, and upward deflection of the water; difference of densities of the water and the matter in suspension. A dense, floating layer of this matter is formed in the lower part of the receptacle a and remains suspended in the water, acting as a natural and constant strainer or filter which gives passage to the ascending water but retains the solids, so that the latter accumulate until they drop into the pipe h. The purified water overflows into the channel f and flows thence through the pipe g, and the separated matter flows through the discharge pipe k, the flow thereof being assisted by a small proportion of the descending water, which flows through the orifice m and carries with it the matter deposited at the bottom of the receptacle a.

When the apparatus is filled with water charged with foreign substances a deposit is rapidly formed below the lower orifice of the tube q. The flow of water through the tube q displaces this deposit, which is lifted by the water ascending in the receptacle a, and forms a natural filter r, the position of which depends on the distance of the lower orifice of the tube q from the bottom of the receptacle a. The additional suspended matter carried by the ascending water is checked by the under-surface s of the filtering layer and accumulates until it has acquired a certain degree of density, whereupon it falls through the orifice m and is carried away through the discharge pipe k.

The floating filter r formed by the matter in suspension is held in equilibrium between the top and bottom of the receptacle by the upward flow of water and by its own weight. The maximum effect of this filter is obtained when the entire mass thereof is opposed to the upward current of water charged with matter in suspension.

The relative dimensions of the parts vary, of course, in practice according to the nature of the mixture to be treated and to the rate at which the charge and discharge are to take place.

Having now particularly described and ascertained the nature of my said invention and in what manner the same is to be performed, I declare that what I claim is:

1. In an apparatus for separating chemical products from water, a receptacle having a transverse area gradually increasing from the bottom to the top thereof, said receptacle having a level top edge, an overflow channel surrounding said edge, a funnel axially supported within the receptacle and having a perforated floor, said floor being slightly below the level of said top edge of the receptacle, a feeding pipe communicating with said funnel, and a normally open discharge pipe communicating with said receptacle at its lowermost point.

2. In an apparatus for separating chemical products from water, a receptacle having a transverse section gradually increasing from the bottom to the top thereof, a normally open discharge pipe, said receptacle narrowing down and merging into the bore of said pipe at its lowermost point, said receptacle being formed with a level overflow edge at its top portion, a supply pipe entering into said receptacle, and a perforated floor slightly below the overflow edge of said receptacle, and in communication with said supply pipe, whereby water entering said supply pipe may contact with the lower surface of the chemical supported by said floor.

3. In an apparatus for separating chemical products from water, a receptacle, a channel surrounding the said receptacle at the top thereof, a funnel supported in the axis of said receptacle, a perforated floor fixed in the said funnel slightly below the level of the top of the receptacle, a feeding pipe placed within the funnel and extending therethrough, the discharge orifice of the said feeding pipe being below the perforated floor, a tube extending from the funnel to the bottom of the receptacle and a discharge pipe at the lower part of the receptacle in the axis thereof.

4. In an apparatus for separating chemical products from water, a receptacle, the sectional area of which decreases gradually from top to bottom, a channel surrounding the said receptacle at the top thereof, a funnel supported axially of said receptacle, a perforated floor in the said funnel slightly below the level of the top of the receptacle, a feeding pipe placed within the funnel and extending therethrough, the discharge orifice of the said feeding pipe being below the perforated floor, a tube extending from the funnel to the bottom of the receptacle and a discharge pipe axially arranged at the bottom of the receptacle.

5. In an apparatus for separating chemical products from water, a receptacle, the sectional area of which decreases gradually from top to bottom, a channel surrounding the said receptacle at the top thereof, a funnel supported in the axis of said receptacle, a perforated floor in the said funnel slightly below the level of the top of the receptacle, a feeding pipe placed within the funnel and extending therethrough, the discharge orifice of the said feeding pipe being below the perforated floor, a tube extending from the funnel to the bottom of the receptacle, and a discharge pipe axially arranged at the bottom of the receptacle, the said discharge pipe being in open communication with the receptacle for the direct discharge of a part of the descending water fed into the tube extending from the funnel to the bottom of the receptacle, substantially as described and for the purpose set forth.

In testimony whereof I have signed my name to this specification in the presence of two subscribing witnesses.

VICTOR ANTOINE.

Witnesses:
GEORG BEDE,
PAUL MAPEY.